(12) United States Patent
Sakemura et al.

(10) Patent No.: US 6,404,124 B1
(45) Date of Patent: *Jun. 11, 2002

(54) ELECTRON EMISSION DEVICE AND DISPLAY APPARATUS USING THE SAME

(75) Inventors: Kazuto Sakemura; Shuuichi Yanagisawa; Shingo Iwasaki; Nobuyasu Negishi; Takashi Chuman; Takashi Yamada; Atsushi Yoshizawa; Hideo Satoh; Takamasa Yoshikawa; Kiyohide Ogasawara, all of Tsurugashima (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,198

(22) Filed: Jul. 28, 1999

(30) Foreign Application Priority Data

Jul. 29, 1998 (JP) .......................................... 10-214489

(51) Int. Cl.[7] .................................................. H01J 1/62
(52) U.S. Cl. ........................ 313/495; 313/309; 313/310
(58) Field of Search ................................ 313/495, 309, 313/310, 336, 351; 257/10

(56) References Cited

U.S. PATENT DOCUMENTS 3,391,309 A   7/1968   Hacskaylo ................. 317/235
5,202,571 A * 4/1993   Hirabayashi et al. ......... 257/10
6,130,503 A * 10/2000  Negishi et al. ............. 313/495

FOREIGN PATENT DOCUMENTS

| EP | 0 798 761 A1 | 10/1997 |
| EP | 0 841 677 A1 | 5/1998 |
| EP | 0 896 354 A1 | 2/1999 |
| EP | 0 911 854 A1 | 4/1999 |
| GB | 2 322 000 A | 8/1998 |
| JP | 7-65710 | 3/1995 |
| NL | 53 842 C | 9/1942 |

OTHER PUBLICATIONS

N. Koshida, T. Ozaki, X. Sheng and H. Koyama, "Cold Electron Emission from Electroluminescent Porous Silicon Diodes", Jpn. J. Appl. Phys. vol. 34 (1995) p. L 705–L 707, Part 2, No. 6A, Jun. 1, 1995.

* cited by examiner

Primary Examiner—Vip Patel
Assistant Examiner—Ken A Berck
(74) Attorney, Agent, or Firm—Morgan, Lewis & Bockius LLP

(57) ABSTRACT

An electron emission device comprises an electron-supply layer made of metal or semiconductor and disposed on an ohmic electrode; an insulator layer formed on the electron-supply layer; and a thin-film metal electrode formed on the insulator layer. The electron-supply layer has a rectifier function layer, whereby the electron emission device emits electrons when an electric field is applied between the electron-supply layer and the thin-film metal.

21 Claims, 5 Drawing Sheets

ELECTRON EMISSION DEVICE AND DISPLAY APPARATUS USING THE SAME

BACKGROUND OF THE INVENTION

1. Field of the Invention

The present invention relates generally to an electron emission device, and more particularly to an electron emission display device which has a plurality of electron emission devices arranged in an image display array, for example, in a matrix form.

2. Description of the Related Art

Conventionally, in field electron emission display apparatuses, a Field Emission Display (FED) is known as a planar emission display device equipped with an array of cold cathode electron emission sources which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There is also known an electron emission device with electron emission devices of metal-insulator-metal (MIM) structure as a planar electron emission source. The electron emission device with the MIM structure comprises an Al underlayer as a base electrode, an $Al_2O_3$ insulator layer with about 10 nm thickness, and a Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode. However, even the electron emission device with the MIM structure does not yet provide a sufficient amount of emitted electrons.

To improve these disadvantages of emission of the MIM device, it is conventionally considered that there is a necessity to make the $Al_2O_3$ insulator layer thinner by about several nanometers and make the $Al_2O_3$ insulator layer with a uniform quality so that the interface between the $Al_2O_3$ insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

OBJECT AND SUMMARY OF THE INVENTION

The present invention has been made in view of the above circumstances, and thus an object thereof is to provide an electron emission device having an electron emitting efficiency high enough to stably emit electrons at a low voltage applied thereto, and moreover a display apparatus including a flat panel display device which employs a plurality of such electron emission devices.

Furthermore, when the plural electron emission devices are used correspondingly to many pixels in a dots matrix for a flat panel display device in view of various technical applications, there is a problem that some of the devices provide erroneous light emission of non-selected pixels caused by erroneous electron radiations due to electrical leak. Another object of the invention is thus to provide an electron emission device with a high reliability for restricting the erroneous light emission and a display apparatus using the same.

The present invention provides an electron emission device which comprises:
  an electron-supply layer made of metal or semiconductor and disposed on an ohmic electrode;
  an insulator layer formed on the electron-supply layer; and
  a thin-film metal electrode formed on the insulator layer,
  characterized in that said electron-supply layer has a rectifier function layer, whereby the electron emission device emits electrons when an electric field is applied between the electron-supply layer and the thin-film metal.

According to the electron emission device having the structure mentioned above, said rectifier function layer includes at least one junction selected from a group consisting of a p-n junction or p-i-n junction composed of semiconductor layers and Schottky junction composed of a semiconductor layer and a metal layer.

According to the electron emission device having the structure mentioned above, said rectifier function layer is disposed at an interface between said ohmic electrode and said electron-supply layer.

According to the electron emission device having the structure mentioned above, said rectifier function layer is disposed at an intermediate region of said electron-supply layer.

According to the electron emission device having the structure mentioned above, said rectifier function layer is disposed at an interface between said insulator layer and said electron-supply layer.

According to the electron emission device having the structure mentioned above, said rectifier function layer includes a p-n junction or p-i-n junction of semiconductors, in which a p-type layer thereof serves as said electron-supply layer and is in contact with said insulator layer, so that said rectifier function layer is disposed between said insulator layer and said ohmic electrode.

According to the electron emission device having the structure mentioned above, said rectifier function layer includes a Schottky junction of semiconductor and metal, in one case, when a semiconductor layer is p-type the p-type semiconductor layer serves as said electron-supply layer and is in contact with said insulator layer, in another case, when a semiconductor layer is n-type a metal layer of the Schottky junction serves as said electron-supply layer and is in contact with said insulator layer, so that said rectifier function layer is disposed between said insulator layer and said ohmic electrode.

According to the electron emission device having the structure mentioned above, said insulator layer is made of dielectric and has a film thickness of 50 nm or greater.

According to the electron emission device having the structure mentioned above, said ohmic electrode is made of titanium nitride.

The present invention further provides an electron emission display device which comprises:
  a pair of a back substrate and an optically transparent front substrate opposing to each other with a vacuum space interposed therebetween;

a plurality of electron emission devices, each of said electron emission devices including an electron-supply layer made of metal or semiconductor, formed on ohmic electrodes formed on a surface of said back substrate proximate to said vacuum space, an insulator layer formed on said electron-supply layer, and a thin-film metal electrode formed on said insulator layer and facing said vacuum space; and said front substrate including collector electrodes formed on its surface proximate to said vacuum space, and fluorescent material layers formed on said collector electrodes, wherein said electron-supply layer has a rectifier function layer.

In the electron emission display device according to the invention, said rectifier function layer includes at least one junction selected from a group consisting of a p-n junction or p-i-n junction composed of semiconductor layers and Schottky junction composed of a semiconductor layer and a metal layer.

In the electron emission display device according to the invention, said rectifier function layer is disposed at an interface between said ohmic electrode and said electron-supply layer.

In the electron emission display device according to the invention, said rectifier function layer is disposed at an intermediate region of said electron-supply layer.

In the electron emission display device according to the invention, said rectifier function layer is disposed at an interface between said insulator layer and said electron-supply layer.

In the electron emission display device according to the invention, said rectifier function layer includes a p-n junction or p-i-n junction of semiconductors, in which a p-type layer thereof serves as said electron-supply layer and is in contact with said insulator layer, so that said rectifier function layer is disposed between said insulator layer and said ohmic electrode.

In the electron emission display device according to the invention, said rectifier function layer includes a Schottky junction of semiconductor and metal, in one case, when a semiconductor layer is p-type the p-type semiconductor layer serves as said electron-supply layer and is in contact with said insulator layer, in another case, when a semiconductor layer is n-type a metal layer of the Schottky junction serves as said electron-supply layer and is in contact with said insulator layer, so that said rectifier function layer is disposed between said insulator layer and said ohmic electrode.

In the electron emission display device according to the invention, said insulator layer is made of dielectric and has a film thickness of 50 nm or greater.

In the electron emission display device according to the invention, said ohmic electrode is made of titanium nitride.

In the electron emission display device according to the invention, the display device further comprises plural insulative support members formed on said back substrate and disposed between adjacent ones of said electron emission devices so as to enclose the electron emission devices for partitioning them, wherein the distance from said back substrate to the surfaces of said insulative support members proximate to said vacuum space is substantially equal to the distance from said back substrate to the surface of said thin-film metal electrodes proximate to said vacuum space.

In the electron emission display device according to the invention, the display device further comprises a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

In the electron emission display device according to the invention, said back substrate includes a plurality of first insulative ramparts formed on said insulative support members, each of which disposed between said electron emission devices and protruding into said vacuum space, whereas said front substrate includes a plurality of second ramparts each of which protrudes into said vacuum space to abut to said first ramparts.

According to the electron emission device of the invention with the above structure, the device comprises a rectifier function layer serving as a diode having a p-n junction, p-i-n junction or Schottky junction allowing electrons to flow only in one way through the electron-supply layer. Therefore, when the plural electron emission devices are used in a flat panel display device, it can provide an accurate light emission without erroneous light emission of non-selected pixels due to electrical leak.

Moreover, through-bores are not likely to be produced in the insulator layer because of its relatively thick thickness and therefore its production yield is improved. The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or sub-millimeter wavelength, and also can serve as a high speed switching device.

DETAILED DESCRIPTION OF THE PREFERRED EMBODIMENTS

An electron emission device according to an embodiment of the present invention will be described in more detail with reference to the accompanying drawings.

Figure 1:
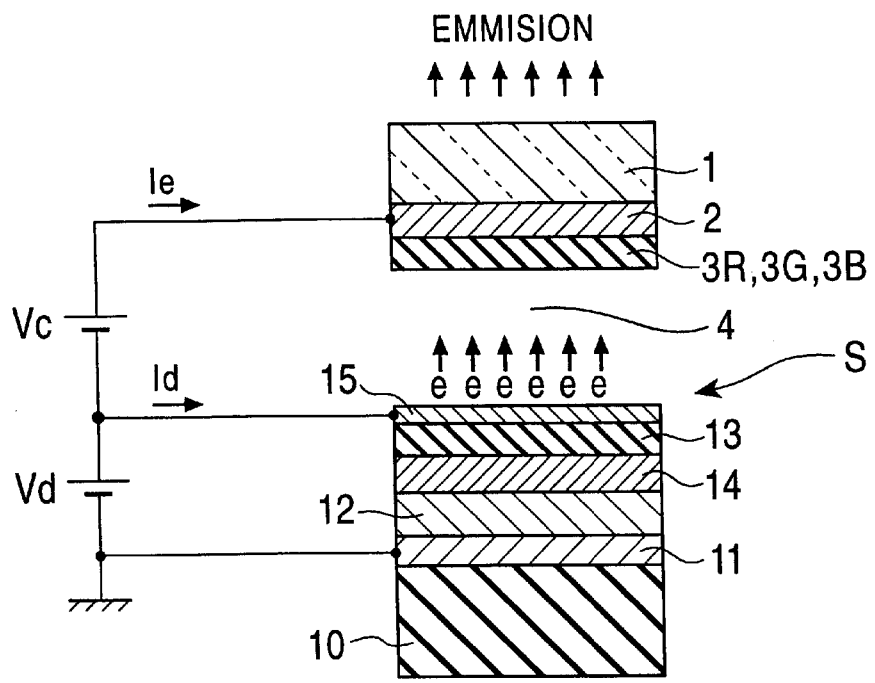
FIG. 1 is a schematic cross-sectional view of an electron emission device according to an embodiment of the present invention.

As illustrated in FIG. 1, one electron emission device is constructed in a stack configuration comprising; an ohmic electrode 11 made of aluminum (Al), tungsten (W), titanium nitride (TiN), copper (Cu), chromium (Cr) or the like on a back side substrate 10 made of a glass or the like; an electron-supply layer 12 made of semiconductor such as silicon (Si) or metal the like on the ohmic electrode 11; an insulator layer 13 made of dielectric such as $SiO_x$ (X=0.1 to 2.0) or the like on the electron-supply layer 12; and a thin-film metal electrode 15 made of metal such as platinum (Pt), gold (Au) or the like facing a vacuum space on the insulator layer 13. Particularly, in the electron-supply layer 12, a rectifier function layer 14 is disposed at an intermediate region thereof, which serves as a diode having a p-n junction, p-i-n junction or Schottky junction allowing electrons to flow only in one way through the device. The insulator layer 13 is deposited in considerably thicker thicknesses so as to have a thickness of 50 nm or greater.

At least one transparent collector electrode 2 of, for example, an indium tin oxide (so-called ITO), tin oxide (SnO), zinc oxide (ZnO) or the like, is formed on the inner surface of a front substrate 1 made of glass. The transparent collector electrode traps emitted electrons. The transparent collector electrodes may be arranged in groups of three in association with red (R), green (G) and blue (B) color signals in order to provide a color display panel, and voltages are applied to those three collector electrodes respectively. The transparent collector electrodes are separately coated with fluorescent materials 3R, G, B which are capable of emitting lights of R, G and B corresponding to the three primary colors of light respectively. A black stripe masks BM or back metal layer may be provided on the front substrate 1 between the fluorescent material layers 3R, G, B. Alternatively the collector electrode 2 may be formed integrally as a monolithic film for a monochrome display panel.

The front substrate 1 and the back substrate 10 with electron emission devices are supported apart from one another in parallel by a spacer and sealed to face each other with a vacuum space 4 interposed therebetween. The material for the back substrate 10 is not limited to glass, and ceramics such as $Al_2O_3$, $Si_3N_4$ and BN etc. may be used instead of glass.

The principle of light emission for this device will be described as follows: this electron emission device can be regarded as a diode of which the thin-film metal electrode 15 at its surface is connected to a positive applied voltage Vd and the ohmic electrode 11 is connected to a ground potential as shown in FIG. 1. When the voltage Vd is applied between the ohmic electrode 11 and the thin-film metal electrode 15 to supply electrons into the electron-supply layer 12, a diode current Id flows. Since the insulator layer 13 has a high resistance, most of the applied electric field is applied and concentrated to the insulator layer 13. The electrons travel in the insulator layer 13 toward the thin-film metal electrode 15. Some of the electrons that reach near the thin-film metal electrode 15 pass through the thin-film metal electrode 15, due to the strong electric field, to be emitted out into the vacuum space.

The electrons "e" (emission current Ie) discharged from the thin-film metal electrode 15 are soon accelerated by a high voltage Vc which is applied to an opposing collector electrode 2 (transparent electrode), and are collected with the collector electrode 2. When a fluorescent substance 3 is coated on the collector electrode 2, corresponding visible light is observed.

Figure 2:
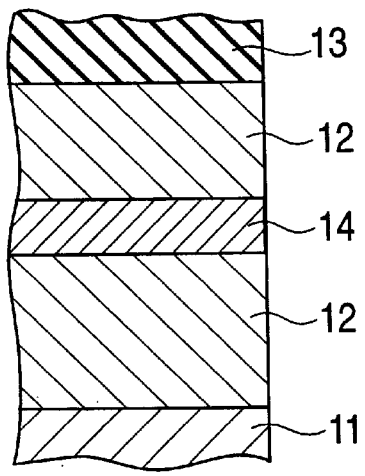
FIG. 2 is a schematic partially enlarged cross-section view illustrating a portion about a rectifier function layer of an electron emission device according to an embodiment of the present invention.
Figure 3:
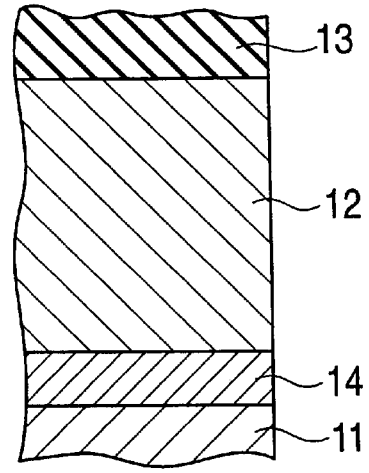
FIG. 3 is a schematic partially enlarged cross-section view illustrating a portion about a rectifier function layer of an electron emission device according to another embodiment of the present invention.

In addition to the arrangement that the rectifier function layer 14 is disposed at the interface between the electron-supply layer 12 and the insulator layer 13 as shown in FIG. 1, the rectifier function layer 14 may be disposed at an intermediate portion of the electron-supply layer 12 as shown in FIG. 2. Further the rectifier function layer 14 may be disposed at the interface between the ohmic electrode 11 and the electron-supply layer 12 as shown in FIG. 3. This rectifier function layer 14 allows electric currents to flow only in one way within the device. In fact, the rectifier function layer 14 serves as a nonlinear circuit component that allows more current to flow in one direction than the other. Ideally, it allows currents to flow in one direction unimpeded but allows no current to flow in the other direction. The rectifier function layer 14 is for example a p-n junction consisting of the p-type silicon layer and the n-type silicon layer. In addition, a p-i-n junction consisting of the p-type silicon layer, the n-type silicon layer and an intrinsic layer i.e., i-type layer of silicon interposed therebetween may be used for the rectifier function layer 14. The Schottky junction or a Schottky barrier diode composed of metal and semiconductor may be also used for the rectifier function layer 14. The Schottky barrier is used for a semiconductor diode having a nonlinear rectifying characteristic and formed by contact between a semiconductor layer and a metal layer. Each of these junctions gives a diode function or rectifier function. The n-type silicon layer is formed such a manner that impurities which generate free electrons when forming covalent bonds in silicon atoms i.e., donors such as elements of Column V in the Periodic Table e.g., phosphorus etc. are doped into a layer of silicon belonging to Column IV. Further, the p-type silicon layer is formed such a manner that impurities which generate free holes when forming covalent bonds in silicon atoms i.e., acceptors such as elements of Column III e.g., boron etc. are doped into a silicon layer. The doping method for impurities is selected from methods of epitaxial growth, ion implantation, thermal diffusion and the like. Particularly the gaseous epitaxial growth is used preferably for the epitaxial growth in the chemical vapor deposition (CVD) and the physical vapor deposition (PVD) such as the vacuum deposition and the sputtering. The density of impurity in the n-type or the p-type layer is selected from the range of $10^{10}/cm^3$ to $10^{20}/cm^3$ and, in such a density of impurity the specific resistance is in the range of $10^{-5}$ to $10^{-3}$ $\Omega \cdot cm$.

For example, to flow electrons from the silicon electron-supply layer 12 to the thin-film metal electrode 15 but not flow in the opposite direction, as shown in FIG. 1 ,for example, the p-type silicon layer is formed at the side of the $SiO_2$ insulator layer 13 and the n-type silicon layer is formed at the side of the ohmic electrode 11. Upon application of a positive potential to the thin-film metal electrode 15 for emitting light, the electrons travel toward the thin-film metal electrode 15 and pass through the thin-film metal electrode 15 to go out of the device, and then are accelerated until they impinge upon the fluorescent substance.

A method of manufacturing the rectifier function layer comprising an n-i-p-type silicon layer structure will be described for one example of the electron emission device. It is possible to employ the sputtering method for depositing the rectifier function layer by using a mask.

Figure 4:
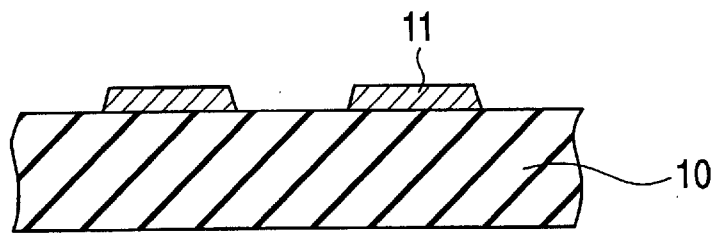
FIGS. 4 to 6 are schematic partial perspective views each illustrating a substrate in a step of manufacturing the electron emission display device according to an embodiment of the present invention.

As shown in FIG. 4, the ohmic electrode 11 on the glass substrate 10 is made of for example titanium nitride. Material of the ohmic electrode is a metal having a high melting point such as tantalum, platinum, cobalt and the like. Preferably, titanium nitride is used for the ohmic electrode 11 since the ohmic electrode is subjected to an atmosphere being apt to be reacted with silicon deposited thereafter.

Next, after putting a predetermined mask on the ohmic electrode 11, an n-type silicon layer "n" is deposited on the ohmic electrode 11 through an aperture of the mask by sputtering. In this case, the sputtering is preformed using a silicon target highly doped in density with antimony or phosphorus and having 1 Ω·cm or less under the atmosphere of argon gas mixed with a little hydrogen gas.

Next, to make sure of formation of the p-n junction in comparison with the case that the p-type silicon is in contact with the n-type silicon layer to form a direct n-p junction, an intrinsic layer "i" (or i-type layer) of silicon with a very low density of impurity is deposited on the n-type silicon layer "n" to form an n+n-p+ structure. In other words, the i-type layer "i" will be inserted between the n-type silicon "n" and the p-type silicon "p". This intrinsic layer "i" is formed on the n-type silicon layer "n" through the same mask by the sputtering with a silicon target having 50 Ω·cm or less.

Figure 5:
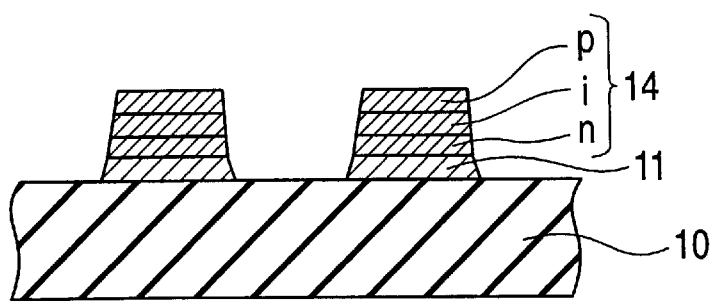

Next, a p-type silicon "p" is deposited on the i-type silicon layer "i" using a silicon target heavily doped with boron and having 1 Ω·cm or less under the same atmosphere as the n-type. In this way, the rectifier function layer 14 is formed on the ohmic electrode 11 as shown in FIG. 5. This p-type silicon layer "p" functions as an electron-supply layer in the electron emission device. After that, as shown in FIG. 6, the insulator layer 13 and the thin-film metal electrode 15 are deposited in turn on the rectifier function layer 14 through the sputtering to complete an electron emission device.

Figure 6:
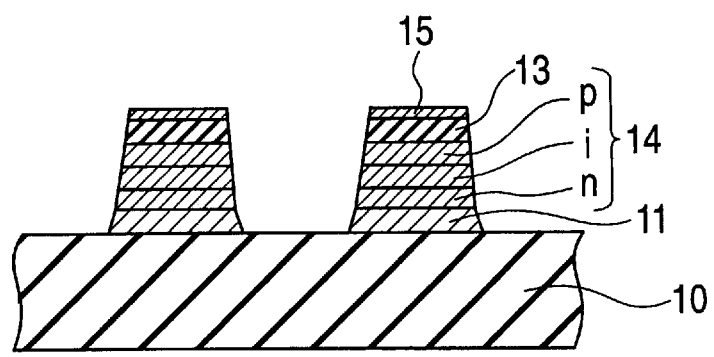

Although the p-type silicon layer of the rectifier function layer shown in FIG. 6 is preferably used for the electron-supply layer of the electron emission device, another silicon layer may be deposited between the rectifier function layer 14 and the insulator layer 13 as the electron-supply layer 12 as shown in FIG. 3 to give an diode characteristic to the device to the end, because this n-i-p-type silicon layer 14 has frequently a high electric resistance. In this case, after depositions for the n-i-p-type silicon layer 14, a thermal heating treatment is preformed thereon to generate a polysilicon status so as to decrease the resistivity of the n-i-p-type silicon layer 14 of the electron emission device.

These layer are formed through the sputtering method by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min.

In a second embodiment, a method of manufacturing the rectifier function layer by means of a plasma CVD method instead of the sputtering method will be described hereinafter.

Figure 7:
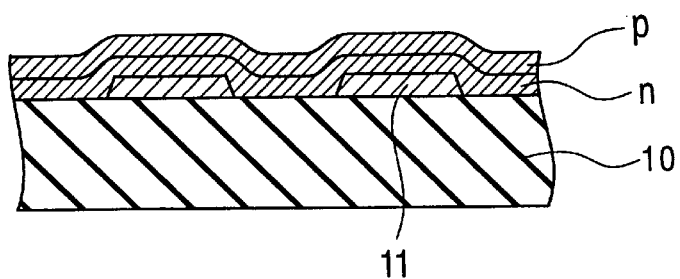
FIGS. 7 to 10 are schematic partial perspective views each illustrating a substrate in a step of manufacturing the electron emission display device according to another embodiment of the present invention.

In a plasma CVD apparatus particularly a reactor thereof, n-type and p-type silicon layers "n" and "p" are deposited in turn on the ohmic electrode 11 previously formed on the glass the back side substrate 10 as shown in FIG. 7. The n-type silicon layer "n" is deposited by using silane gas to which phosphine is added at several percents or lower through the plasma CVD. The p-type silicon layer "p" is then deposited on the n-type silicon layer by using silane gas to which diborane is added at several percents or lower through the plasma CVD. The CVD is able to comparatively facilitate the deposition of p-n junction and there is little or no necessity of deposition for the i-type silicon between the n-type and p-type silicon layers.

Figure 8:
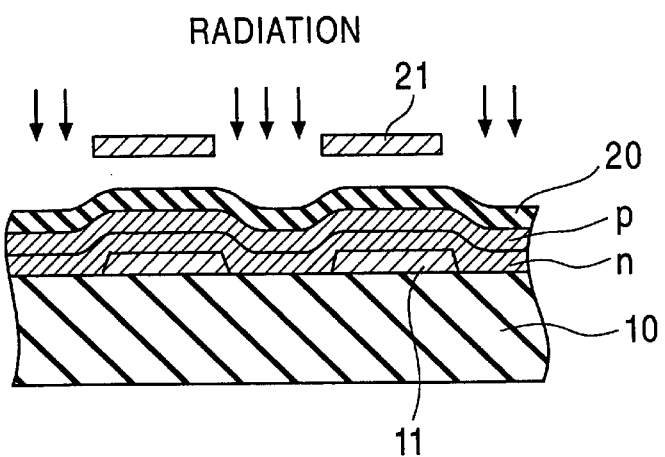

After that, a stripe structure of the silicon layers corresponding to the ohmic electrodes 11 is formed by etching. The etching process is preformed as shown in FIG. 8 so that first a resist layer 20 is formed on the silicon layer "p" and dried, and then irradiated with light energies through a predetermined photo-mask 21 put on the resist layer.

Figure 9:
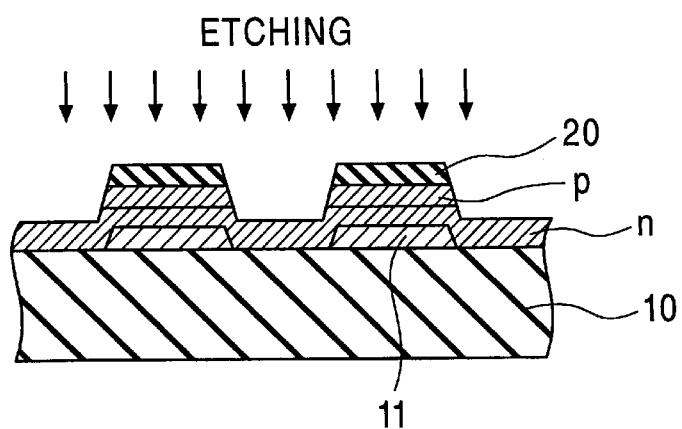
Figure 10:
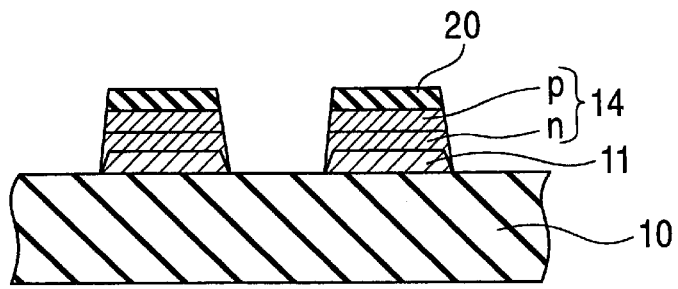

Next, as shown in FIG. 9, non-irradiated portions are etched and removed by using a predetermined developing liquid, so that the silicon layers "n" and "p" and resist 20 remain over the ohmic electrode 11. Then the processed substrate is washed and dried. After that, hydrofluoric acid solvent is provided in a spray form onto the resist 20 side of the substrate to remove the remaining portions of silicon layers between the ohmic electrodes, as shown in FIG. 10, so that a plurality of the rectifier function layers 14 each having a predetermined p-n junction layer-structure. Then the processed substrate is washed and dried. After that, an ashing treatment is preformed on the processed substrate by using an oxygen plasma to remove the remaining resists 20 from the substrate. In addition, the processed substrate may be subjected to a heating treatment to decrease the electric resistance of the device.

After that, the insulator layer 13 and the thin-film metal electrode 15 are deposited in turn on the rectifier function layer 14 through the sputtering to complete an electron emission device in the same way as the method shown in FIG. 6.

In a third embodiment, an electron emission device of a third embodiment comprising the rectifier function layer including the Schottky junction instead of the p-n junction is manufactured in the same way as the method used in the second embodiment above-mentioned. In this case, the Schottky junction formed by contact between the semiconductor layer and the metal layer is fabricated as follows: When the semiconductor layer is the p-type the semiconductor layer is disposed as the electron-supply layer to contact the insulator layer. In case that the semiconductor layer is the n-type, the metal layer is disposed as the electron-supply layer to contact the insulator layer. In both the cases, the rectifier function layer including the Schottky junction is placed between the insulator layer and the ohmic electrode.

Moreover, in another embodiment, the rectifier function layer may be formed within the electron-supply layer 12 in such a manner that predetermined dopants are dispersed therein by means of the ion implanting method.

Electron emission devices according to the invention were fabricated as examples and their characteristics were examined concretely. In each example, by using a sputtering method, an ohmic electrode of $TiO_x$ (wherein x represents an integer) was previously deposited with thick of 300 nm on a back substrate of glass and then an electron-supply layer of Si was deposited with 5 μm on the ohmic electrode. Then, an insulator layer of SiOx was deposited with a thickness e.g., 400 nm ranging from 50 to 1000 nm on the electron-supply layer. Finally, a thin-film metal electrode of Pt was deposited with a thickness of 10 nm on the amorphous SiOx layer. In this way, plural devices i.e., back substrates were completed. Meanwhile, transparent substrates for front substrates were prepared, each of which has an ITO collector electrode formed inside of a transparent glass substrate and has a fluorescent layer of a fluorescent substance formed on the collector electrode. Electron emission devices were assembled in each of which the device substrate and the transparent substrate are supported apart from one another by a 10 mm gap in parallel by a spacer in such a way that the thin-film metal electrode faced the collector electrode, with the clearance therebetween made to a vacuum of $10^{-7}$ Torr or $10^{-5}$ Pa. Then, the emission characteristics of the resultant electron emission devices were measured.

In view of those results of the variations of the maximum emission current Ie and the maximum electron emission efficiency (Ie/Id) respectively with respect to the film thickness ranging from 50 nm to 1000 nm of the insulator layer of the devices, it was understood that by applying a voltage of 200 V or lower, the electron emission efficiency of $1\times10^{-3}$ or greater was acquired from an electron emission device which has an SiOx dielectric layer 50 nm or greater in a thickness, preferably ranging from 50 to 1000 nm.

With a voltage of approximately 4 kV applied between the fluorescent-substance coated collector electrode and the thin-film metal electrode, a uniform fluorescent pattern corresponding to the shape of the thin-film metal electrode was observed in the devices whose $SiO_2$ layers have thicknesses of 50 nm or greater.

There were observations of the surface of the SiOx insulator layer resulted form the oxidation of the electron supply layer by a scanning electron microscope (SEM) during the above formation process, grain surface each having an about 20 nm diameter appeared. The grain structure of SiOx of the insulator layer seems to cause the peculiar phenomenon that the passing current flows through the insulator layer which has a thickness of 50 nm or greater.

As a result, the electron emission device comprising an ohmic electrode, an electron-supply layer made of silicon, an insulator layer, a thin-film metal electrode, and a bus line which are formed in turn on the substrate, is remarkably improved in cost and production yield because the rectifier function layer e.g., p-n junction is embedded in the electron-supply layer of silicon, which may disuse necessary external transistors for rectification to be provided separately to the normal device.

Silicon oxide $SiO_x$ (wherein subscribed x represents an atomic ratio) is effective as the dielectric material of the insulator layer 13 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well.

Furthermore, metal complex oxides such $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2—Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well for the insulator layer 13. And still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer 13.

Moreover, carbon such as diamond, Fullerene ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

An effective material for the electron-supply layer 12 of the electron emission device is silicon (Si) and particularly the hydrogenated amorphous silicon (a-Si:H) in which almost of the dangling bonds of a-Si are terminated by hydrogen atoms is effective. In addition, hydrogenated amorphous silicon carbide (a-SiC:H) in which parts of Si atoms are replaced by carbon atoms (C) is also effectively used for the electron-supply layer 12. Moreover hydrogenated amorphous silicon nitride (a-SiN:H) in which parts of Si atoms are replaced by nitrogen atoms (N) may be also effectively used for the electron-supply layer 12. In addition, silicon doped with boron, aluminium, gallium, phosphorus, indium, arsenic and/or antimony may be used for the electron-supply layer 12. Instead of Si, an elemental semiconductor or a compound semiconductor of an element of a group IV, a group III-V, a group II-VI or the like, such as a germanium (Ge), germanium silicon compound (Ge—Si), silicon carbide (SiC), gallium arsenide (GaAs), indium phosphide (InP), or cadmium selenide (CdSe) or $CuInTe_2$ can be used for the electron-supply layer 12 of the electron emission device as well.

While metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used for the electron-supply layer 12 as well.

Metals Pt, Au, W, Ru and Ir are effective as the material for the thin-film metal electrode 15 on the electron emission side. In addition, Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Figure 11:
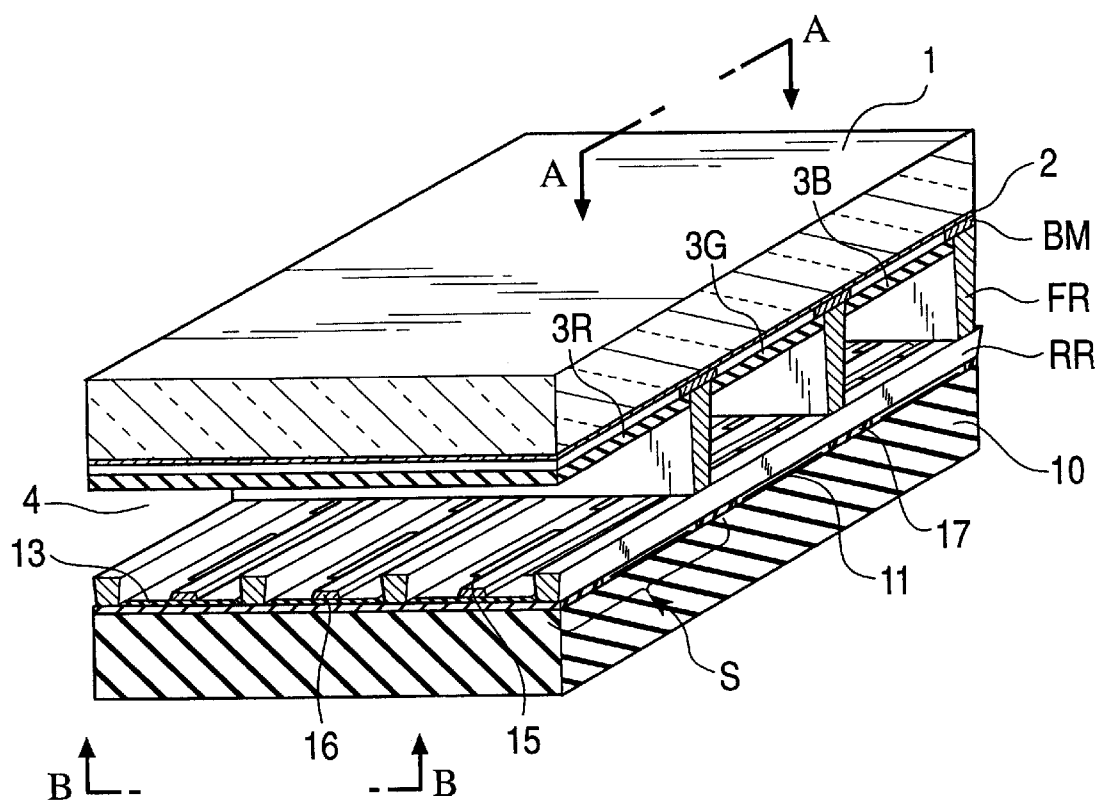
FIG. 11 is a schematic partial perspective view illustrating an electron emission display device according to an embodiment of the present invention.

FIG. 11 illustrates an embodiment of an electron emission display device comprising ramparts or ribs are formed therein and a plurality of electron emission devices arranged in an image display array, for example, in a matrix array. The illustrated electron emission display device comprises a pair of a front substrate 1 of optically transparent and a back substrate 10 made of glass or the like. Rear ramparts or ribs RRs formed on the back substrate 10 abut to front ramparts or ribs FRs formed on the front substrate 1 at the top surfaces thereof so that both the substrates are placed apart from and parallel to each other with a vacuum space 4 interposed therebetween.

A plurality of ohmic electrodes 11 extending in parallel with each other are formed on the inner surface of the back substrate 10 proximately to the vacuum space 4. The ohmic electrodes 11 are grouped into sets of three corresponding to R (red), G (green), B (blue) color signals to provide a color display panel, and are applied with predetermined signals, respectively. On the ohmic electrodes 11, a plurality of electron emission devices S are formed and arranged in a matrix form. On portions of thin-film metal electrodes of adjacent devices, a plurality of bus electrodes 16 extending perpendicular to the ohmic electrodes and in parallel with each other are routed to electrically connect the thin-film metal electrodes. An intersection of an ohmic electrode 11 and a bus electrode 16 corresponds to an electron emission device S. Therefore, a passive matrix scheme or an active matrix scheme may be applied as a driving scheme for the display apparatus of the present invention. When driving the device to emit light i.e., applying a positive potential to the thin-film metal electrode 15, electrons travel toward the thin-film metal electrode 15 in the forward direction of the rectifier function layer 14, and some of the electrons reaching at the thin-film metal electrode 15 pass through it into the vacuum space. The electrons are soon accelerated until reaching at the fluorescent substance 3. However when being in the reverse bias no current flows. Any closed circuit by way of other pixels in the matrix display panel is not provided. Therefor any electric leak does not occur in the reverse bias.

Figure 12:
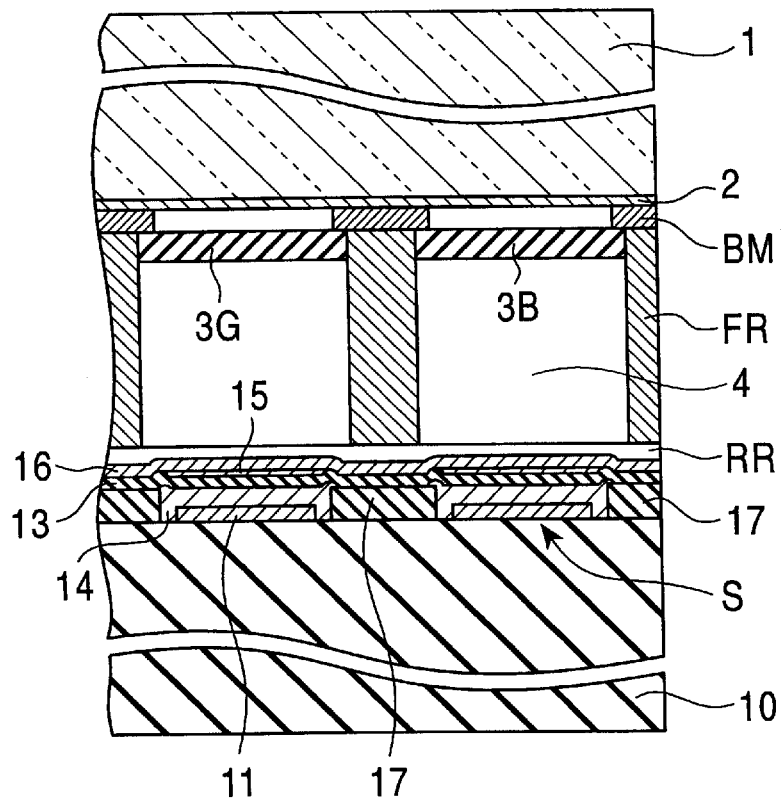
FIG. 12 is a schematic partial enlarged cross-sectional view of the electron emission display device according to the present invention, taken with a line AA in FIG. 11.

As illustrated in FIG. 12, each electron emission device S comprises a rectifier function layer 14 having an electron-supply layer as a P-type silicon layer, an insulator layer 13 and a thin-film metal electrode 15 formed in this order on the ohmic electrode 11. See FIG. 6. The thin-film metal electrode 15 faces the vacuum space 4. The ohmic electrode 11 of stripe type has dimensions e.g., the width 160 μm, the thickness 0.3 μm and the line interval 300 μm.

In particular, an insulative support member 17 is formed to surround each of the electron emission devices S and to define a plurality of electron emitting regions. The insulative support member 17 supports the bus electrodes 16, and prevents line failures. More specifically, as illustrated in FIG. 12, the insulative support member 17 or a material having a large electric resistance is previously formed in peripheral portions except for the electron emission devices in a thickness similar to a final thickness of the electron emission devices when formed in subsequent steps. The insulative support member 17 has a thickness 5 μm for example.

Further, in this embodiment, the rear ribs RRs associated with the back substrate 10 is formed on the insulative support member 17 so as to protrude into the vacuum space 4 from the back substrate 10. The ribs RRs are positioned at predetermined intervals. While in FIG. 11, the ribs RRs are formed between respective electron emission devices S, the ribs RRs may be formed at larger intervals, for example, every two or three electron emission devices S. Also, while in FIG. 11, the ribs RRs are continuously formed in a direction substantially perpendicular to the ohmic electrodes 11, the ribs RRs may be intermittently formed so as to leave upper areas including portions abutting to the front ramparts FRs associated with the front substrate 1, but not illustrated. In this way, the direction in which the bus electrodes 16 extend can be matched with fluorescent layers 3R, 3G, 3B.

In any case, the ribs RR are formed between the electron emission devices S.

Figure 13:
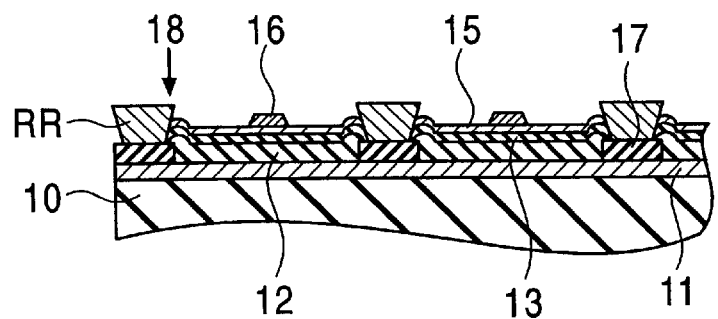
FIG. 13 is a schematic partial enlarged cross-sectional view showing a back side substrate in the electron emission display device according to the present invention, taken with a line BB in FIG. 11.

Preferably, each of the ribs RRs has its top surface area larger than the bottom surface area which is in contact with the back substrate 10. In other words, each of the ribs RR is preferably formed to have an overhung portion 18 on its top which protrudes in a direction substantially parallel with the back substrate 10. As shown in FIG. 13, the rear ribs RRs preferably have a trapezoidal cross-section in the electrode direction such that the length of an area (bottom surface) contacting with the insulative support member 17 in the electrode direction is shorter than that of the top surface as shown in FIG. 13. In other words, overhung portions 18 protruding in a direction parallel with the substrate are formed on the top of the rear ribs RRs in the direction in which the rear ribs RRs extend. Other than screen printing, the overhung portions 18 may be formed as undercuts of the rear ribs RRs using other appropriate techniques such as a photolithography method or the like.

Further, while in FIG. 11, the bus electrodes 16 disposed on the thin-film metal electrodes 15 of the back substrate 10 are formed in a simple linear shape, the bus electrodes 16 are preferably formed, instead of the linear shape, so as to have a width between the thin-film metal electrodes 15 of the electron emission devices larger than that on the thin-film metal electrodes. In other words, the bus electrodes 16 are preferably formed to be wider between the electron emission devices than on the devices. In this way, the electric resistance of the bus electrodes can be reduced.

In addition, an auxiliary insulator layer comprised of an insulator such as $SiO_2$, $SiN_x$, $Al_2O_3$ or AlN may be provided between the back substrate 10 and the ohmic electrode 11, but not shown in FIG. 11. The auxiliary insulator layer serves to prevent an adverse influence of the back substrate 10 on the device (such as elution of an impurity such as an alkaline component or a roughened substrate surface).

From the principle of electron emission, it is better that the material for the thin-film metal electrode 15 has a lower work function ø and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag, Cu and Ir or an alloy thereof or a multi-layer thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 μm. If the electrical resistance of material of the thin-film metal electrode is allowable for the bus electrodes, such electrode material may be used for the bus electrodes.

On the other hand, transparent collector electrodes 2 made of ITO to which a high voltage is applied are integrally formed on the inner surface (surface opposing to the back substrate 10) of the optically transparent front substrate 1 made of transparent glass and serving as a display surface. In case that a black stripe mask or back metal layer is provided on the front substrate 1, such a conductive layer may be serve as a collector electrode instead of the ITO transparent collector electrode.

On the collector electrodes 2, a plurality of front ribs (second insulative rib) FRs are formed in parallel with the ohmic electrodes 11. On the collector electrodes 2 between the extending front ribs, fluorescent material layers 3R, 3G, 3B made of fluorescent materials corresponding to R, G, B are formed, respectively, in opposition to the vacuum space 4. In this way, the front ribs (second insulative rib) FRs are provided at boundaries of the respective fluorescent materials to maintain a constant distance (for example, 1 mm) between the back substrate and the front substrate. Since the front ribs (second insulative rib) FRs are disposed on the front substrate 1 in a direction orthogonal to the rear ribs (first insulative rib) RRs disposed on the back substrate 10, it is ensured that the front substrate are definitely colored by the fluorescent materials in R, G, B corresponding to the three primary colors of light.

As described above, the electron emission display device according to this embodiment has an image display array composed of a plurality of light emitting pixels which are arranged in a matrix form and each of which includes red (R), green (G) and blue (B) light emitting elements. Of course, a monochrome display panel may be formed by replacing all the RGB light emitting elements with monochrome light emitting elements.

What is claimed is:

1. An electron emission device comprising:
    an electron-supply layer made of metal or semiconductor and disposed on an ohmic electrode, wherein the electron-supply layer includes a rectifier function layer;
    an insulator layer covering the electron-supply layer and the rectifier function layer; and
    a thin-film metal electrode formed on the insulator layer,
    whereby the electron emission device emits electrons when an electric field is applied between the electron-supply layer and the thin-film metal electrode.

2. An electron emission device according to claim 1, wherein said rectifier function layer includes at least one junction selected from a group consisting of a p-n junction or p-i-n junction composed of semiconductor layers and Schottky junction composed of a semiconductor layer and a metal layer.

3. An electron emission device according to claim 1, wherein said rectifier function layer is disposed at an interface between said ohmic electrode and said electron-supply layer.

4. An electron emission device according to claim 1, wherein said rectifier function layer is disposed at an intermediate region of said electron-supply layer.

5. An electron emission device according to claim 1, wherein said rectifier function layer is disposed at an interface between said insulator layer and said electron-supply layer.

6. An electron emission device according to claim 1, wherein said rectifier function layer includes a p-n junction or p-i-n junction of semiconductors, in which a p-type layer thereof serves as said electron-supply layer and is in contact with said insulator layer, so that said rectifier function layer is disposed between said insulator layer and said ohmic electrode.

7. An electron emission device comprising:
    an electron-supply layer made of metal or semiconductor and disposed on an ohmic electrode;
    an insulator layer formed on the electron-supply layer; and
    a thin-film metal electrode formed on the insulator layer, wherein the electron-supply layer includes a rectifier function layer that includes a Schottky junction of semiconductor and metal, wherein if a semiconductor layer is p-type, the p-type semiconductor layer serves as said electron-supply layer and is in contact with said insulator layer and if a semiconductor layer is n-type, a metal layer of the Schottky junction serves as said electron-supply layer and is in contact with said insulator layer, so that said rectifier function layer is disposed between said insulator layer and said ohmic electrode, whereby the electron emission device emits electrons when an electric field is applied between the electron-supply layer and the thin-film metal electrode.

8. An electron emission device according to claim 1, wherein said insulator layer is made of dielectric and has a film thickness of 50 nm or greater.

9. An electron emission device according to claim 1, wherein said ohmic electrode is made of titanium nitride.

10. An electron emission display device comprising:
    a pair of a back substrate and an optically transparent front substrate opposing to each other with a vacuum space interposed therebetween;
    a plurality of electron emission devices, each of said electron emission devices including an electron-supply layer made of metal or semiconductor, formed on ohmic electrodes formed on a surface of said back substrate proximate to said vacuum space, an insulator layer formed on said electron-supply layer, and a thin-film metal electrode formed on said insulator layer and facing said vacuum space; and
    said front substrate including collector electrodes formed on its surface proximate to said vacuum space, and fluorescent material layers formed on said collector electrodes,
    wherein said electron-supply layer has a rectifier function layer.

11. An electron emission display device according to claim 10, wherein said rectifier function layer includes at least one junction selected from a group consisting of a p-n junction or p-i-n junction composed of semiconductor layers and Schottky junction composed of a semiconductor layer and a metal layer.

12. An electron emission display device according to claim 10, wherein said rectifier function layer is disposed at an interface between said ohmic electrode and said electron-supply layer.

13. An electron emission display device according to claim 10, wherein said rectifier function layer is disposed at an intermediate region of said electron-supply layer.

14. An electron emission display device according to claim 10, wherein said rectifier function layer is disposed at an interface between said insulator layer and said electron-supply layer.

15. An electron emission display device according to claim 10, wherein said rectifier function layer includes a p-n junction or p-i-n junction of semiconductors, in which a p-type layer thereof serves as said electron-supply layer and is in contact with said insulator layer, so that said rectifier function layer is disposed between said insulator layer and said ohmic electrode.

16. An electron emission display device according to claim 10, wherein said rectifier function layer includes a Schottky junction of semiconductor and metal, in one case, when a semiconductor layer is p-type the p-type semiconductor layer serves as said electron-supply layer and is in contact with said insulator layer, in another case, when a semiconductor layer is n-type a metal layer of the Schottky junction serves as said electron-supply layer and is in contact with said insulator layer, so that said rectifier function layer is disposed between said insulator layer and said ohmic electrode.

17. An electron emission display device according to claim 10, wherein said insulator layer is made of dielectric and has a film thickness of 50 nm or greater.

18. An electron emission display device according to claim 10, wherein said ohmic electrode is made of titanium nitride.

19. An electron emission display device according to claim 10 further comprising plural insulative support members formed on said back substrate and disposed between adjacent ones of said electron emission devices so as to enclose the electron emission devices for partitioning them, wherein the distance from said back substrate to the surfaces of said insulative support members proximate to said vacuum space is substantially equal to the distance from said back substrate to the surface of said thin-film metal electrodes proximate to said vacuum space.

20. An electron emission display device according to claim 10 further comprising a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

21. An electron emission display device according to claim 10, wherein said back substrate includes a plurality of first insulative ramparts formed on said insulative support members, each of which disposed between said electron emission devices and protruding into said vacuum space, whereas said front substrate includes a plurality of second ramparts each of which protrudes into said vacuum space to abut to said first ramparts.

* * * * *